June 6, 1961
R. T. SHEEHAN
BUCKET CONVEYOR
2,987,165
Filed May 27, 1957
2 Sheets-Sheet 1
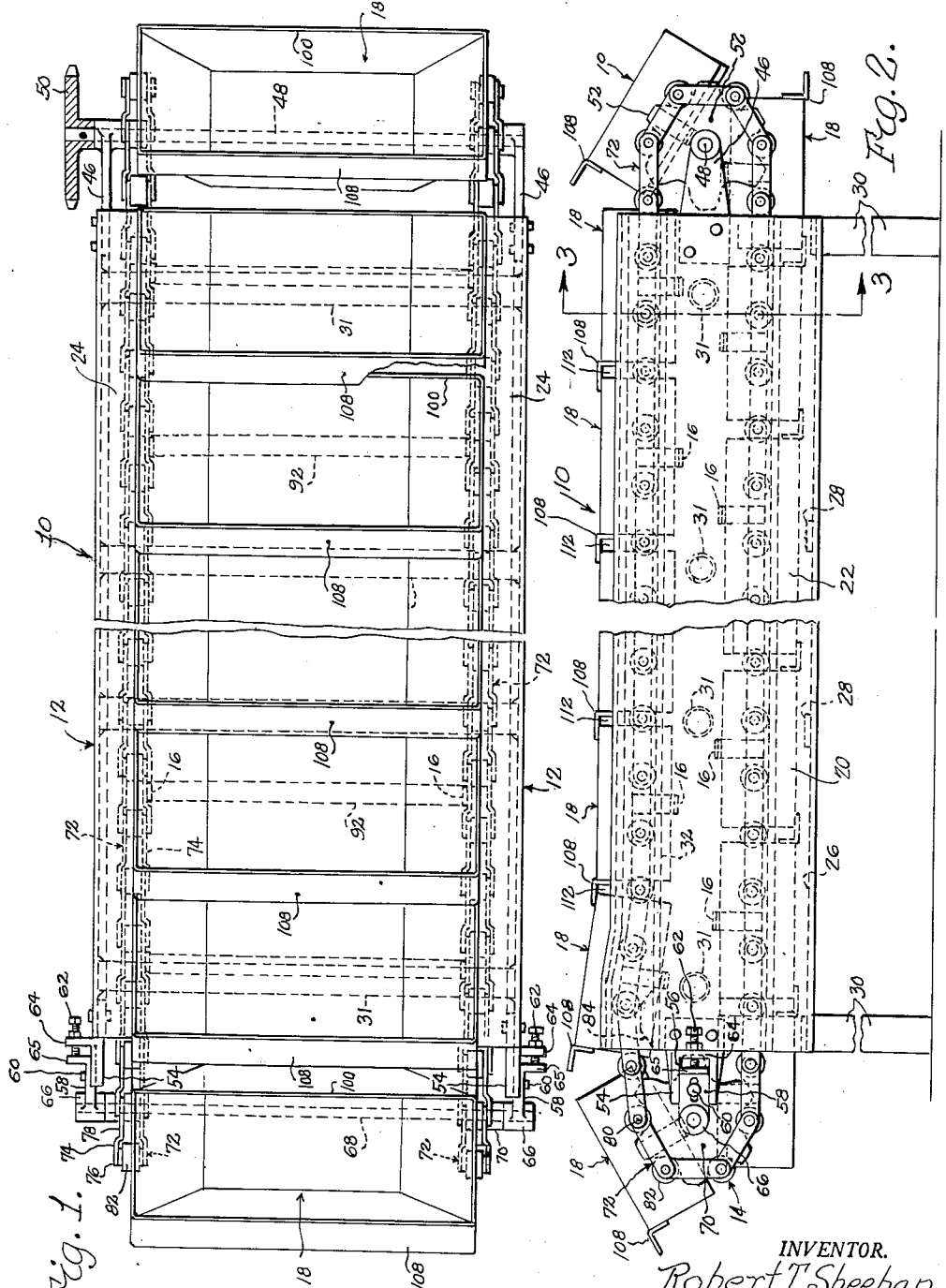
INVENTOR.
Robert T. Sheehan
BY Barthel + Bugbee
Attys

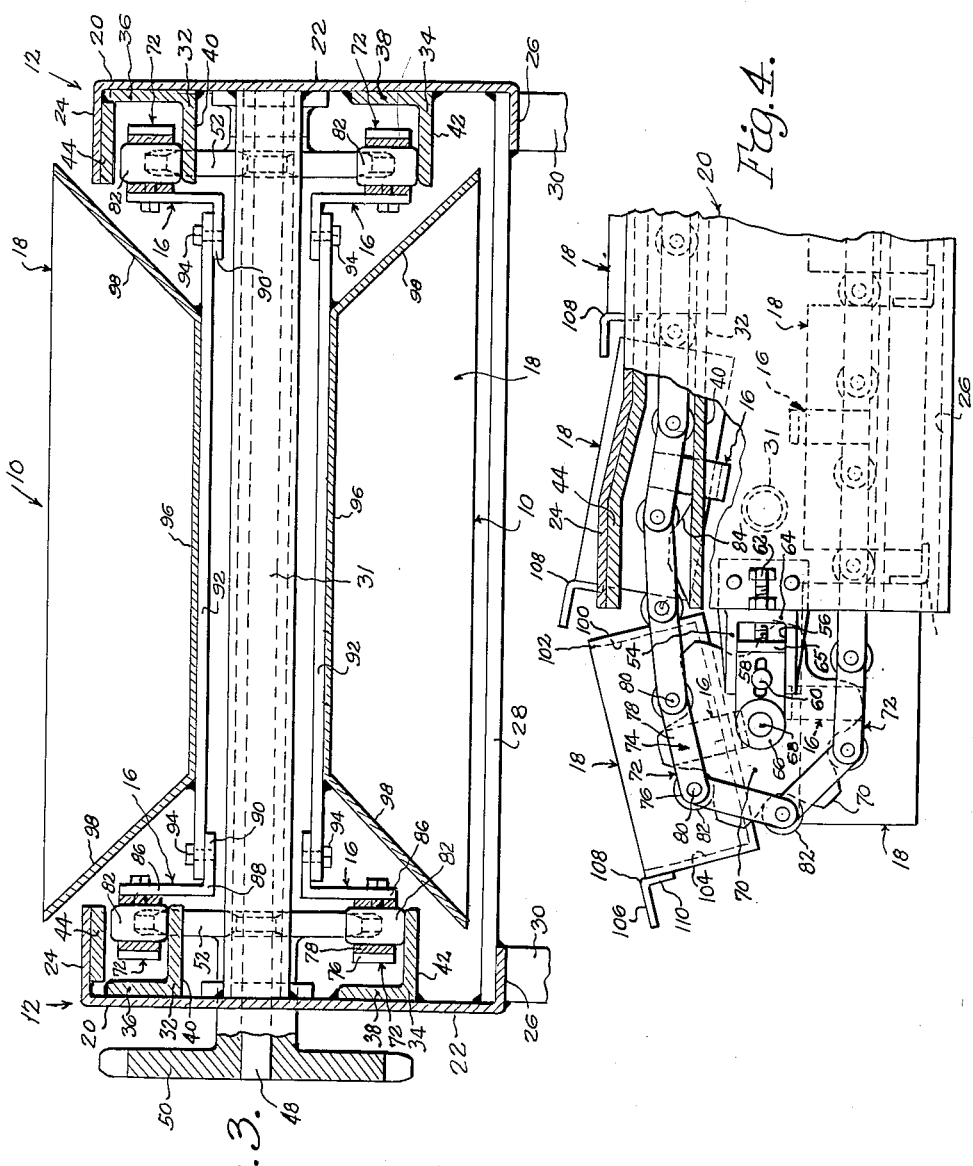

United States Patent Office 2,987,165
Patented June 6, 1961

2,987,165
BUCKET CONVEYOR
Robert T. Sheehan, Livonia, Mich.
Filed May 27, 1957, Ser. No. 661,820
4 Claims. (Cl. 198—140)

This invention relates to conveyors and, in particular, to bucket conveyors.

One object of this invention is to provide a bucket conveyor having an improved and simplified construction for mounting the buckets upon the conveyor chains and rendering the buckets quickly and easily interchangeable for repairs or replacement.

Another object is to provide a bucket conveyor having a simple and effective means for closing the gaps between adjacent buckets so as to prevent loss of materials by falling through such gaps, as well as causing wear and other damage to the conveyor chains, sprockets, shafts and bearings by the abrasive effect thereon of such materials.

Another object is to provide a bucket conveyor which has a minmum of moving parts, is free from piano hinges, and which is so constructed and arranged that each bucket completely dumps its load and moves entirely out of the way before the next succeeding bucket arrives at the dumping point and dumps its respective load.

Another object is to provide a bucket conveyor which is of universal application in that the buckets can be used to convey substantially any kind of material whether solids, liquids, powders, grains, chemicals, chips, stamping scrap from stamping presses, flash from forging presses, hot sand from foundry shakeouts, corrosive materials whether alkaline or acid, and many other substances both hot and cold.

Another object is to provide a bucket conveyor which gives an even-metered flow of conveyed materials or articles, which enables such articles to straddle buckets without falling between them, and which gives a troughing effect without deformation.

Other objects and advantages of the invention will become apparent during the course of the following description of the accompanying drawings, wherein:

FIGURE 1 is a top plan view of a bucket conveyor according to one form of the invention, with the central portion thereof broken away to conserve space and enable the showing of the invention upon a larger scale;

FIGURE 2 is a side elevation of the bucket conveyor shown in FIGURE 1;

FIGURE 3 is a vertical cross-section taken along the line 3—3 in FIGURE 2 showing the bucket carrier construction; and FIGURE 4 is an enlarged fragmentary side elevation of the left-hand end of FIGURE 2, partly broken away to show the bucket tilting device whereby the forward edge of a succeeding bucket is caused to dip beneath the lip on the rearward edge of the preceding bucket to prevent loss of materials through the gap therebetween.

Referring to the drawings in detail, FIGURES 1 and 2 show a bucket conveyor, generally designated 10, according to the invention, consisting generally of a frame structure 12 supporting a chain conveyor unit 14 provided with bucket carriers 16 (FIGURE 3) which in turn support material-conveying buckets 18. The frame structure 12 consists of a pair of elongated channel members 20 having vertical webs 22 (FIGURE 3) in the form of elongated plates with upper and lower flanges 24 and 26 extending toward one another. The lower flanges 26 are interconnected by cross bars 28 welded thereto, and supporting legs 30 are also welded at their upper ends to the lower flanges 28. The webs 22 are also interconnected at intervals by tubular struts 31, the opposite ends of which are welded or otherwise secured thereto (FIGURE 3).

Welded or otherwise secured to the inner sides of the channel member webs 22 (FIGURE 3) are vertically-spaced upper and lower guide tracks 32 and 34 respectively of angle cross-section, commonly known as angle bars, the vertical portions 36 and 38 of which are welded to the webs 22 and the horizontal portions 40 and 42 respectively project inward toward their opposite counterparts parallel to the flanges 24 and 26. An elongated wear plate 44 is welded or otherwise secured to the underside of each upper flange 24 and extends therealong parallel to the horizontal upper guide track portion 40 in spaced relationship therewith.

Bolted, riveted or otherwise secured to the webs 22 near their forward ends are forwardly-projecting parallel horizontal bearing brackets or arms 46 (FIGURES 1 and 2) in the forward or bearing ends of which is journaled a conveyor drive shaft 48. Pinned or otherwise drivingly secured to the drive shaft 48 at one end thereof is a drive sprocket 50 (FIGURES 1 and 3) which is drivingly connected by a conventional drive chain (not shown) to a conventional power source (also not shown), such as a conventional electric motor and reduction gear box. Such motors and gear boxes are standard equipment in the machine industry and hence require no detailed description.

Keyed or otherwise drivingly secured to the drive shaft 48 in line with the guide tracks 32 and 34 are two horizontally-spaced conveyor chain driving sprockets 52. Bolted, riveted or otherwise secured to the rearward ends of the channel members 20 are spaced parallel rearwardly-projecting bearing supporting brackets 54 (FIGURES 1 and 4), each having a parallel-walled guideway 56 in which is slidably mounted a slotted bearing slide block 58 which is clamped in position by a clamping bolt 60 after being adjustably moved to that position by an adjusting bolt or screw 62 threaded through an angle portion 64 of the bracket 54 against an angle portion 65 of the slide block 58 (FIGURE 1) and locked in position by the usual lock nut. Each of the bearing slide blocks 58 at its rearward end is provided with a bearing boss 66 and journaled in the opposed bearing bosses 66 (FIGURES 1, 2 and 4) is an idler shaft or driven shaft 68. Keyed or otherwise drivingly secured to the driven shaft 68 and disposed in the same spaced parallel planes as the conveyor driving sprockets 52 are two conveyor supporting or idler sprockets 70 of similar construction.

Mounted on the driving and driven sprockets 52 and 70 respectively of the chain conveyor unit 14 are conveyor chains, generally designated 72. The conveyor chains 72 may be of any suitable type, the type shown being selected for purposes of illustration and not limitation. Each conveyor chain 72 consists of parallel links 74 (FIGURES 1 and 4) offset laterally at their rearward ends 76 so that their major portions 78 remain in substantially the same vertical planes. The thus overlapping links 74 are bored to receive roller axles 80 upon which rollers 82 are rotatably mounted.

For the purpose of tilting the buckets 18 as they enter the rearward end of the frame structure 12 so as to cause the forward edge of each bucket 18 to dip beneath the lipped rearward edge of the next preceding bucket in order to close the gap therebetween, as explained below, the upper guide tracks 32 near the rearward or left-hand end of their horizontal portions 40 are each provided with a hump or upstanding projection 84 (FIGURES 2 and 4), the height of which is exaggerated in the drawings to bring it out more clearly. Each hump 84 is disposed near the inner or free edge of each horizontal portion 40 in the path of its respective conveyor chain rollers 82.

Welded, brazed or otherwise firmly and solidly secured to the approximate mid-portions of the links 74 of the conveyor chains 72 are the vertical arms 86 of angle brackets 88, the horizontal arms 90 of which face inwardly toward those of their counterparts on the opposite side of the conveyor. Associated with the angle brackets 86 and forming therewith the bucket carriers 16 are bucket supporting bars 92 which at their opposite ends are bolted as at 94 to the horizontal arms 90 of the angle brackets 88. In the upper course of the conveyor unit 14, the angle brackets 86 depend from the chain links 74 (FIGURE 3) whereas in the lower courses thereof these brackets 86 are of course inverted.

Welded or otherwise secured to each conveyor supporting bar 92 is the bottom wall 96 of a bucket 18, the lateral side walls 98 of which are inclined (FIGURE 3) relatively to the horizontal and vertical. The forward wall 100 of each bucket 18 terminates at its upper edges 102 in a plain edge, whereas the rearward wall 104 thereof is provided with a rearwardly-extending flange or lip 106 either integral therewith or in the form of an angle member 108 having a vertical portion 110 welded or otherwise secured to the rearward end wall 104 (FIGURE 4).

In the operation of the invention, let it be assumed that the drive sprocket 50 has been connected to a conventional power source by a conventional sprocket chain (not shown), such as in the manner described above, and that the conveyor chains 72 of the chain conveyor unit 14 have been adjusted to their proper tightness or slackness by the adjusting bolts 62 engaging the bearing slide blocks 58. Let it also be assumed that the conveyor 10 is arranged so that the conveyor chains 72 are so driven as to move in a clockwise direction by clockwise rotation of the drive sprocket 50 and drive shaft 48, causing the chain driving sprockets 52 and the driven sprockets 70 likewise to move in clockwise rotation.

Material to be conveyed is dropped into the buckets 18 toward the left-hand end of the conveyor 10 (FIGURE 2) by any suitable means, the particular construction of which is not within the scope of the present invention. The conveyed material, for example, may be deposited in the buckets 18 by a spout or by another conveyor, or may even be poured or shovelled therein. As each bucket 18 is carried upward around the driven or idler sprockets 70, its conveyor chain rollers 82 successively engage and roll upward over the humps 84 located at the entrances to the upper guide rails 32 at the rearward ends thereof (FIGURE 4), causing the forward upper edge 102 of the forward wall 100 of each bucket to dip beneath the rearwardly-extending horizontal lip or flange 106 of the next preceding bucket 18. As the rearmost rollers 82 on the rearward side of the bucket supporting brackets 86 descend from their respective humps 84, the tilted bucket 18 resumes its horizontal position with its forward upper edge 102 beneath the rearwardly-extending lip 106 of the next preceding bucket 18, thereby closing the gap 112 between them (FIGURE 2), and preventing any materials from dropping through any of the gaps 112. As each bucket 18 arrives at the forward or discharge end of the conveyor 10 (FIGURE 2), it is tilted and thereafter inverted as it passes around the sprockets 52, dumping the contents of the bucket. Meanwhile, however, the next preceding bucket 18 has passed in an inverted condition beneath the sprockets 52 out of the way of the material being dumped from the succeeding bucket 18, so that no interference between buckets occurs. Moreover, on account of the provision of the bucket-tilting humps 84 (FIGURE 4), no clashing occurs between buckets.

In the event that changing of buckets becomes necessary either for repairs or replacement, this can be accomplished merely by removing the bolts 94 (FIGURE 3), inserting another bucket or the same repaired bucket 18, and then replacing the bolts 94. The buckets 18 require no holes in their walls for any purpose and therefore are inherently liquid-tight if such tightness is so desired. On the other hand, if it is desired to drain liquid from the conveyed materials during conveying, this may obviously be done by forming holes in the buckets 18 or by providing buckets 18 of screen or mesh material.

What I claim is:

1. A bucket conveyor comprising an elongated supporting structure having elongated conveyor chain guide members mounted thereon in laterally-spaced substantially parallel relationship, a plurality of pairs of laterally-spaced conveyor-supporting wheels rotatably mounted on said structure in longitudinally-spaced relationship, a pair of endless conveyor chains mounted on said wheels in laterally-spaced parallel planes for travel in orbital paths along said guide members, bucket supports secured to said chains at longitudinally-spaced intervals therealong on the inner sides thereof, cross members secured to and extending laterally between said supports, and conveyor buckets having bottom walls secured to said cross members at longitudinally-spaced intervals along said chains, said bucket supports comprising angle brackets having vertical portions secured to and depending from said chains and having horizontal portions extending inwardly from the lower ends of said vertical portions toward the bottom walls of said buckets and connected to said cross members, each bucket having opposite side walls inclined upwardly and outwardly from its respective bottom wall in laterally-overhanging relationship to said angle brackets.

2. A bucket conveyor comprising an elongated supporting structure having elongated conveyor chain guide members mounted therein in laterally-spaced substantially parallel relationship, a plurality of pairs of laterally-spaced conveyor-supporting wheels rotatably mounted on said structure in longitudinally-spaced relationship, a pair of endless conveyor chains mounted on said wheels in laterally-spaced parallel planes for travel in orbital paths along said guide members, bucket supports secured to said chains at longitudinally-spaced intervals therealong on the inner sides thereof; conveyor buckets secured to said bucket supports, said buckets having overlapping edge portions, and means associated with said conveyor chain guide members for tilting the leading edge of one bucket beneath the trailing edge of the adjacent bucket to dispose said edge portions in overlapping relationship.

3. A bucket conveyor according to claim 2, wherein the bucket tilting means includes immediately-adjacent portions of said laterally-spaced conveyor chain guide members disposed on different levels in a direction longitudinally of said chains and wherein the chain adjacent each bucket is provided with rollers simultaneously engageable with said portions of different levels.

4. A bucket conveyor according to claim 3, wherein said portions of different levels include humps on said guide members engageable successively with adjacent rollers.

References Cited in the file of this patent

UNITED STATES PATENTS

| | | |
|---|---|---|
| 329,862 | Stephens | Nov. 3, 1885 |
| 381,456 | Woodbury | Apr. 17, 1888 |
| 559,370 | Dodge | May 5, 1896 |
| 583,424 | Acklin | May 25, 1897 |
| 631,718 | Hunt et al. | Aug. 22, 1899 |
| 1,442,292 | Pfeiffer | Jan. 16, 1923 |
| 1,459,253 | Plummer | June 19, 1923 |
| 1,518,951 | Andrus | Dec. 9, 1924 |

FOREIGN PATENTS

| | | |
|---|---|---|
| 397,192 | Germany | June 30, 1924 |